United States Patent [19]

Nishiyama et al.

[11] Patent Number: 4,782,437
[45] Date of Patent: Nov. 1, 1988

[54] MAGNETIC MATERIAL BIASING METHOD AND APPARATUS

[75] Inventors: Yoshiaki Nishiyama, Hiratsuka; Hidesumi Nakahashi, Kamakura, both of Japan

[73] Assignee: NCR Corporation, Dayton, Ohio

[21] Appl. No.: 79,853

[22] Filed: Jul. 30, 1987

[30] Foreign Application Priority Data

Aug. 29, 1986 [JP] Japan .................................. 61-201901

[51] Int. Cl.⁴ .......................................... H02M 3/335
[52] U.S. Cl. ....................................... 363/56; 363/21; 363/97
[58] Field of Search ....................... 363/20, 21, 56, 97

[56] References Cited

U.S. PATENT DOCUMENTS

| | | | |
|---|---|---|---|
| 4,135,234 | 1/1979 | Forge ................................ | 363/97 X |
| 4,342,075 | 7/1982 | Hiromitsu ......................... | 363/23 |
| 4,347,559 | 8/1982 | Sturgeon .......................... | 363/21 |
| 4,481,565 | 11/1984 | Colton .............................. | 363/21 X |
| 4,537,520 | 8/1985 | Ochiai et al. ..................... | 400/124 |
| 4,539,905 | 9/1985 | Zenner ............................. | 101/93.05 |
| 4,552,471 | 11/1985 | Gugel et al. ..................... | 400/124 |
| 4,555,192 | 11/1985 | Ochiai ............................. | 400/124 |
| 4,583,871 | 4/1986 | Ochiai et al. ..................... | 400/124 |
| 4,585,361 | 4/1986 | West et al. ....................... | 400/124 |
| 4,642,743 | 2/1987 | Radcliffe .......................... | 363/56 X |

FOREIGN PATENT DOCUMENTS 0026870 4/1981 European Pat. Off. .
0374768 3/1964 Switzerland .

*Primary Examiner*—Patrick R. Salce
*Assistant Examiner*—Kristine Peckman
*Attorney, Agent, or Firm*—Wilbert Hawk, Jr.; Albert L. Sessler, Jr.

[57] ABSTRACT

In an apparatus such as a transformer comprising at least a magnetic core and a main winding, a method and apparatus for biasing of a magnetic material is characterized in that an auxiliary winding N2 is added to said magnetic core 2 and a predetermined amount of demagnetizing current, which will reduce the magnetic flux caused by said main winding N1 by a predetermined amount, is caused to flow through said auxiliary winding N2 in synchronism with an increase in the magnetic flux caused by said main winding N1 to prevent the magnetic saturation of the magnetic core during the time that the magnetic flux caused by the main winding is increasing.

7 Claims, 1 Drawing Sheet

MAGNETIC MATERIAL BIASING METHOD AND APPARATUS

BACKGROUND OF THE INVENTION

The present invention relates to a method of and apparatus for biasing magnetic material for the purpose of realizing the miniaturization of magnetic material employed in apparatuses such as transformers, inductors and the like.

The characteristic of magnetically soft material such as silicon steel, ferrite or the like is as shown by the hysteresis loop and saturation magnetization curve in FIG. 2. In the drawing, B is the magnetic flux density, Bm is the saturation magnetic flux density, Br is residual magnetic flux density, H is magnetizing force, Hc is coercive force and Hs is saturation magnetizing force. As is apparent from the saturation magnetization curve shown in FIG. 2, even if a magnetizing force H (designated by the product of current in the winding and the number of turns of the winding), which is in excess of a predetermined amount, is provided to the magnetic material, the magnetic flux density B within the magnetic material will not exceed a predetermined amount Bm, due to the magnetic saturation. The value Bm is determined by the property of the material and the configuration of the magnetic material, gaps in a magnetic path and the like. The higher the saturation value Bm is, the more miniaturized can be an inductor which can realize predetermined inductance value and conductive current value, or the more miniaturized can be a transformer which can be made by a small number of windings.

Now, in case that current flows or voltage is applied intermittently to one end of the winding wound about the magnetic core, the magnetic material fulfills its function in a range from the saturation magnetic flux density Bm to the residual magnetic flux density Br in FIG. 2. In case that the current is directed or the voltage is applied to one end of the winding, the magnetic material cannot be used beyond the range (Bm−Br) simply by providing the core having the winding wound on it as in the case of the conventional magnetic core.

However, as is apparent from FIG. 2, as a property of magnetic material, the magnetic flux density thereof can vary within a range from +Bm to −Bm. A magnetic core with magnetic polarity 10 shown in FIG. 3 has been devised based on this fact. The core has a permanent magnet 12 which is inserted into a magnetic path such that the magnetic flux density obtained when the magnetizing force H is "0", that is, the residual magnetic flux density Br, exhibits a negative value. Thereby it spreads substantially the usable range of the magnetic flux density. Thus, the combination of the magnetic core with a permanent magnet permits a reduction in utilizing volume of the magnetic material and hence the miniaturization of the apparatus.

However, the biasing method which uses the permanent magnet 12 for magnetically biasing (the magnetic core with magnetic polarity 10) has the following drawbacks: the core 10 is specific and expensive; the bias level is fixed because the bias is applied by the permanent magnet 12; the magnetic property of the permanent magnet 10 deteriorates with long term usage; and the like.

SUMMARY OF THE INVENTION

The present invention has been developed to overcome the above mentioned drawbacks associated with the prior art.

In accordance with a first embodiment of the invention, a method of biasing a magnetic core of a transformer which also includes a primary coil and a secondary coil having outputs, in order to prevent saturation of said core, comprises the following steps: providing an auxiliary coil in operative relation to said core and associated operating circuitry for said auxiliary coil, said operating circuitry including first and second switching means; applying potential to said primary coil of said transformer to produce potentials in said second coil, on the outputs thereof and in said auxiliary coil; applying the potential produced in said auxiliary coil to operate said first switching means which is contained in an energizing circuit for said second switching means; operating said second switching means in response to the operation of said first switching means to complete a circuit extending from the outputs of said secondary coil to said auxiliary coil; and applying the potential on the outputs of the secondary coil to the auxiliary coil to generate a magnetic field which acts to prevent saturation of said transformer core.

In accordance with a second embodiment of the invention, a transformer apparatus comprises, in combination: a primary winding having input means associated therewith for applying potential to said primary winding; a secondary winding having output means associated therewith; a magnetic core operatively associated with said primary and secondary windings, said primary winding when potential is applied thereto generating magnetic flux in said core; an auxiliary winding operatively associated with said magnetic core and operable to decrease the magnetic flux of said core; first switching means having operating means associated therewith and coupled across said auxiliary winding; second switching means having operating means associated therewith; first circuit means coupled across the output means of said secondary winding and serially coupling said second switching means and said auxiliary winding; and second circuit means coupled across the output means of said secondary winding and serially coupling said first switching means and said operating means for said second switching means, whereby applying potential to said input means of said primary winding produces potentials in said secondary winding and said auxiliary winding, the potential in said auxiliary winding causing operation of said first switching means, which in turn causes operation of said second switching means to cause the potential on the output means of the secondary winding to be applied to the auxiliary winding to bias the magnetic core to prevent saturation thereof.

Accordingly, an object of the present invention is to provide a biasing method and apparatus for magnetic material so as to spread the usable range of the magnetic flux density with no use of a special core to reduce the utilizing volume of the magnetic material, thereby realizing the miniaturization of the apparatus.

In order to attain the above-mentioned object, in the present invention, in addition to the conventional magnetic core and main winding, an auxiliary winding is provided and is so constructed as to decrease the magnetic flux which is generated in a magnetic path by the main winding in a predetermined amount in synchronism with an increase in said magnetic flux during the time that said magnetic flux is increasing, to prevent the magnetic saturation of the magnetic material of the magnetic core.

DETAILED DESCRIPTION OF THE INVENTION

Next, the present invention will be described with reference to the accompanying drawings.

Figure 1:
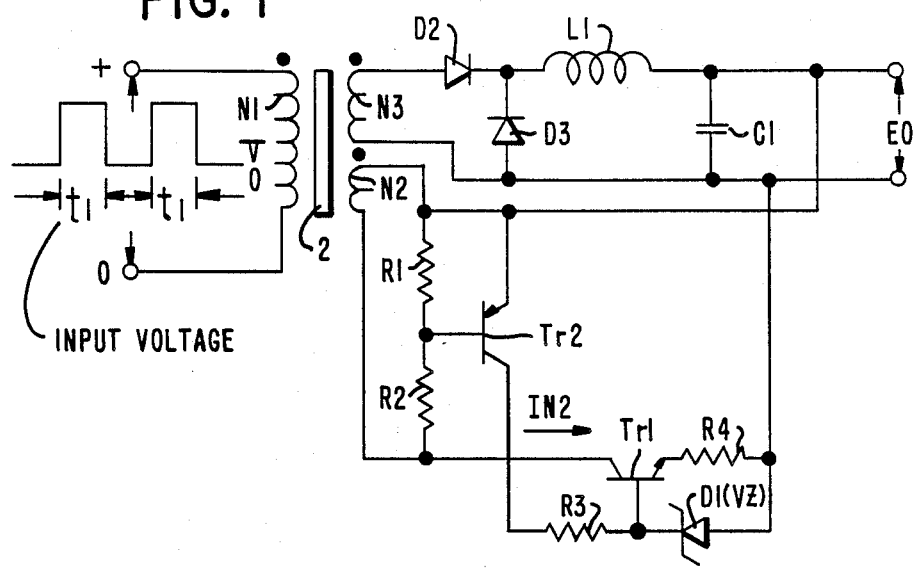
FIG. 1 is a circuit diagram showing an embodiment of a circuit for the biasing of magnetic material according to the present invention which is applied to a transformer.

FIG. 1 is a circuit diagram according to an embodiment of the present invention which is applied to a transformer. In FIG. 1, when input voltage with a waveform shown in the drawing is applied across the main winding N1, voltage corresponding to $n_3/n_1$ of the input voltage in magnitude and having the same waveform as the input voltage is produced between the terminals of a winding N3. Numeral 2 denotes a magnetic core. A conventional transformer includes the core 2, the main winding N1 and the output winding N3. The condition under which the core 2 is not saturated is determined by the following equation (1):

$$n_1 \geq \frac{V \times t1}{A \times \Delta B} \times 10^{10} \quad (1)$$

where $n_1$ is the number of turns of the main winding N1, V is the maximum input voltage (V), t1 is impression time of input voltage (second), A is the minimum sectional area in the magnetic path of the core 2 (mm$^2$), and $\Delta B$ is usable range of the magnetic flux density, that is, Bm-Br (gauss).

The equation (1) indicates that the relation between the number of turns $n_1$ of the main winding N1 and the sectional area A in the magnetic path of the core 2 to prevent the core from being saturated is determined by $\Delta B$, that is, a difference between the saturation magnetic flux density Bm and the residual magnetic flux density Br of the core 2, on condition that the input voltage and the impression time of input voltage t1 are constant. Inversely speaking, a larger $\Delta B$ ensures the use of the core 2 with no saturation, even when the number of turns of the main winding is further reduced or the sectional area A in the magnetic path of the core 2 is further decreased. Taking notice of this point, in the conventional magnetic core with magnetic polarity, the magnetic material is biased magnetically to decrease the residual magnetic flux density Br to a negative value with the use of the permanent magnet to increase the value of $\Delta B$. On the other hand, in the present invention, the magnetic material is biased magnetically by a demagnetizing winding (auxiliary winding) N2 which is operative to demagnetize the magnetic flux density through the magnetic material in synchronism with the waveform of the input voltage applied across the main winding N1 to reduce the residual magnetic flux density Br to a negative value.

Next, the operation of the embodiment shown in FIG. 1 will be described.

The windings N3 and N2 are wound about the magnetic core in such manner that during the time that the input voltage is being applied across the main winding N1 (a term t1), voltage, in a direction causing the forward bias of a diode D2 and the reverse bias of a diode D3, is induced across the output winding N3. Also, voltage, in a direction to turn on a transistor Tr2, is induced across the auxiliary winding N2. The inductor L1 is a smoothing inductor.

Now, supposing that the input voltage is applied across the main winding N1 (the term t1), voltage Eo is developed across the capacitor C1 by the winding N3. Also, voltage is induced across the auxiliary winding N2, and the emitter-base of the transistor Tr2 is forward biased by resistors R1 and R2 so that the transistor Tr2 is in the "on" state. When the transistor Tr2 is turned on, base current is supplied through a resistor R3 to transistor Tr1 to turn the transistor Tr1 on and then the voltage Eo is applied across the winding N2. In this case, if the voltage Eo exceeds the value of $V \times (n_2/n_1)$, the current $I_{N2}$ flows through the winding N2 in a direction to decrease the exciting current in the winding N1. The magnetizing current $I_{N2}$ is always maintained constant by a circuit arrangement consisting of the transistor Tr1, a resistor R4, and a Zener diode D1 (Zener voltage $V_Z$) as shown in FIG. 1. The relation thereof is expressed by the following equation (2):

$$V_{BE} + I_{N2} \cdot R4 = V_Z,$$

$$\text{Therefore, } I_{N2} = \frac{V_Z - V_{BE}}{R4} \text{ (constant)} \quad (2)$$

($V_{BE}$ is the base-emitter voltage on the transistor Tr1.)

As has been described above, in the present invention, the circuit arrangement in which the Zener diode D1 is used maintains the demagnetizing current $I_{N2}$ constant during the period of time t1, so that the exciting current in the main winding N1 is not affected. That is, the magnetic flux density in the core 2 is demagnetized by the predetermined amount always during the time t1. Supposing that the demagnetized amount is designated by $\Delta B1$, the following equation (3) is established:

$$\Delta B1 = \mu H - \mu \cdot n_2 \cdot I_{N2} \quad (3)$$

($n_2$ is the number of turns of N2, and $\mu$ is the magnetic permeability of magnetic material)

As is apparent from the above description, the present invention is constructed such that the voltage Eo exceeds the voltage induced by the auxiliary winding N2 and the demagnetizing current $I_{N2}$ is maintained constant by the circuit in which the Zener diode is used, by which the magnetic flux density in the core 2 is demagnetized by the predetermined amount $\Delta B1$ to prevent the magnetic saturation of the core 2.

Next, the time t2 during which no voltage is applied across the winding N1 will be described. The transistor Tr2 is in the off state during the period of time t2, so that the transistor Tr1 is also turned off and hence no current flows through the winding N2. The core 2 is not demagnetized in the absence of the demagnetizing current $I_{N2}$ in the winding N2, so that the magnetic flux density of the core 2 instantaneously increases the moment the time is changed from t1 to t2. However, since no voltage is applied across the winding N1, even a saturated core 2 causes no problem.

Figure 4:
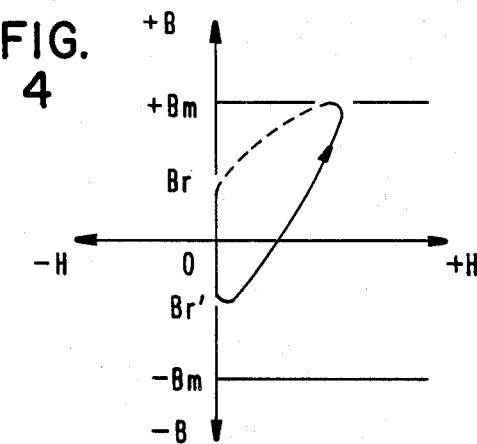
FIG. 4 is a diagram showing a change of magnetic flux density within the magnetic material to which the present invention is applied.
Figure 2:
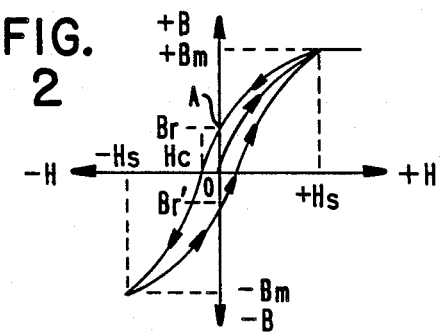
FIG. 2 shows the saturation magnetization curves (B-H magnetization curves) and hysteresis loop of magnetic material.
Figure 3:
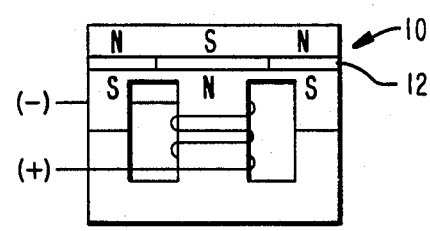
FIG. 3 is a diagram showing an arrangement within a conventional magnetic core with magnetic polarity.

FIG. 4 shows a change in the magnetic flux density in the core 2. The magnetic flux density in magnetic material is demagnetized by the amount $\mu \cdot n_2 \cdot I_N$ derived from the equation (3) during the time t1, so that the saturation point is substantially raised by the amount corresponding thereto.

The present invention can apply to an inductor in the same manner as it is applied to the transformer with the exception that an external D-C voltage source corresponding to the voltage Eo in FIG. 1 is needed.

As has been described above, according to the present invention, the addition of the auxiliary winding about the magnetic core and the simple circuit makes possible the further miniaturization of a magnetic device and the further reduction of the number of turns of the main winding, thereby permitting the miniaturization of the magnetic material applied apparatus. Under given working conditions, the present invention which is applied to the transformer and the inductor realized a reduction of about 30% in volume of the magnetic material as compared to conventional transformers or inductors which use magnetic material that is not biased magnetically.

What is claimed is:

1. A method of biasing a magnetic core of a transformer which also includes a primary coil and a secondary coil having outputs, in order to prevent saturation of said core, comprising the following steps:
   providing an auxiliary coil in operative relation to said core and associated operating circuitry for said auxiliary coil, said operating circuitry including first and second switching means;
   applying potential to said primary coil of said transformer to produce potentials in said secondary coil, on the outputs thereof and in said auxiliary coil;
   applying the potential produced in said auxiliary coil to operate said first switching means which is contained in an energizing circuit for said second switching means;
   operating said second switching means in response to the operation of said first switching means to complete a circuit extending from the outputs of said secondary coil to said auxiliary coil; and
   applying the potential on the outputs of the secondary coil to the auxiliary coil to generate a magnetic field which acts to prevent saturation of said transformer core.

2. The method of claim 1, in which said first and second switching means are transistors.

3. The method of claim 1, in which completion of the step of applying potential to said primary coil causes said first switching means to stop conducting which in turn causes said second switching means to stop conducting and interrupts the application of potential from the outputs of the secondary coil to the auxiliary coil.

4. A transformer apparatus comprising, in combination:
   a primary winding having input means associated therewith for applying potential to said primary winding;
   a secondary winding having output means associated therewith;
   a magnetic core operatively associated with said primary and secondary windings, said primary winding when potential is applied thereto generating magnetic flux in said core;
   an auxiliary winding operatively associated with said magnetic core and operable to decrease the magnetic flux of said core;
   first switching means having operating means associated therewith and coupled across said auxiliary winding;
   second switching means having operating means associated therewith;
   first circuit means coupled across the output means of said secondary winding and serially coupling said second switching means and said auxiliary winding; and
   second circuit means coupled across the output means of said secondary winding and serially coupling said first switching means and said operating means for said second switching means, whereby applying potential to said input means of said primary winding produces potentials in said secondary winding and said auxiliary winding, the potential in said auxiliary winding causing operation of said first switching means, which in turn causes operation of said second switching means to cause the potential on the output means of the secondary winding to be applied to the auxiliary winding to bias the magnetic core to prevent saturation thereof.

5. The transformer apparatus of claim 4, in which said first and second switching means are transistors.

6. The transformer apparatus of claim 5, in which the operating means of the first and second switching means are emitter-base circuits.

7. The transformer apparatus of claim 4, also including a Zener diode which is included in said second circuit means.

* * * * *